2 Sheets—Sheet 1.
P. W. MACKENZIE.
Velocipede.
No. 3,319.
Reissued March 2, 1869.
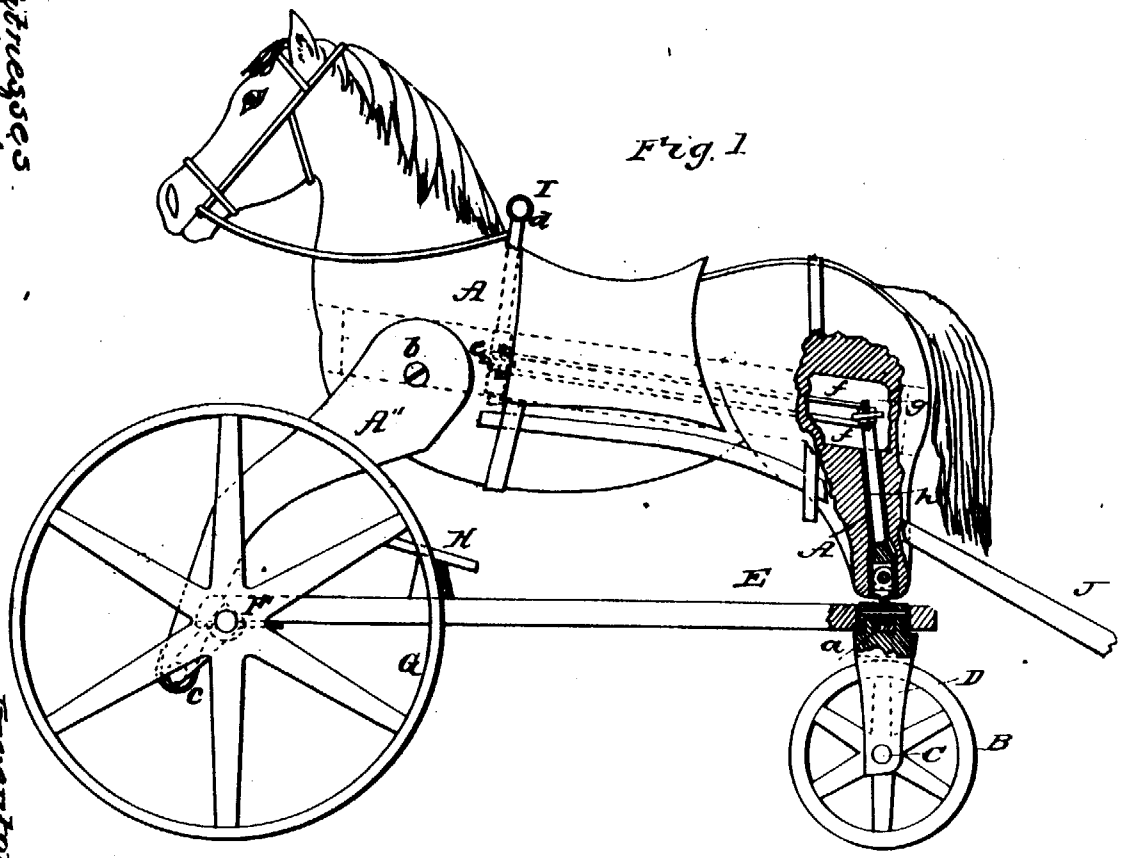
Witnesses
James Paul
R. Gowley.
Inventor
P. W. MacKenzie
H. PETERS, Photo-Lithographer, Washington, D.C.

2 Sheets—Sheet 2.
P. W. MACKENZIE.
Velocipede.
No. 3,319. Reissued March 2, 1869.
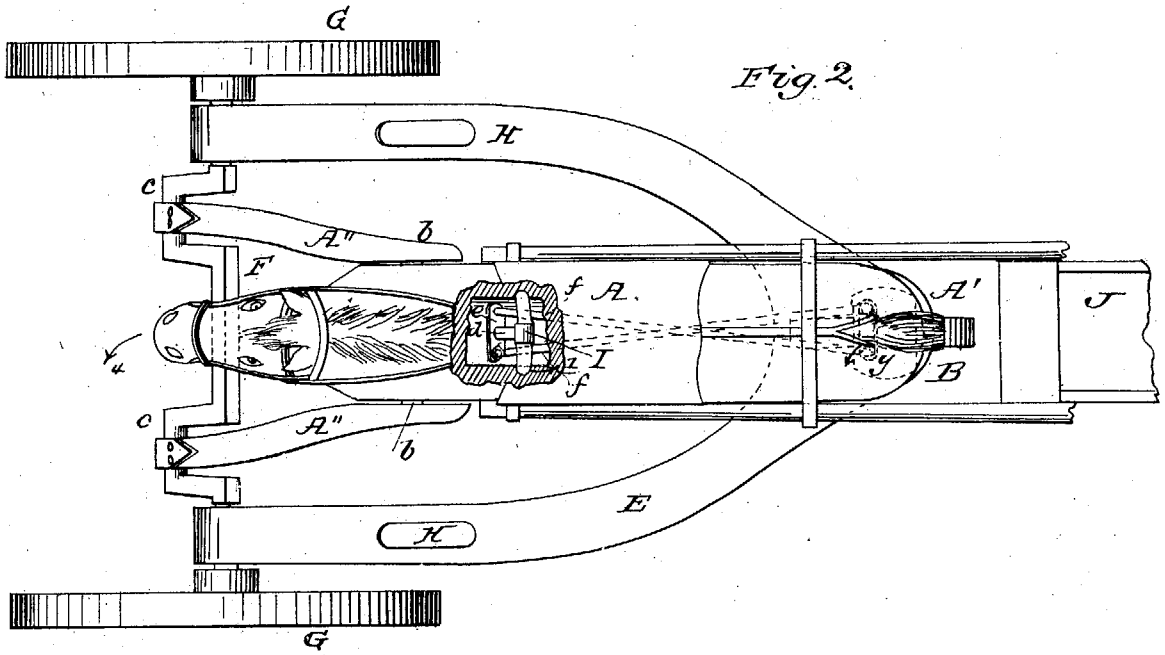
Witnesses
James and
R. Halway.
Inventor
P. W. Mackenzie
N. PETERS, Photo-Lithographer, Washington, D. C.

UNITED STATES PATENT OFFICE.

STEPHEN W. SMITH, OF NEW YORK, N. Y., ASSIGNEE OF P. W. MACKENZIE.

IMPROVEMENT IN VELOCIPEDES.

Specification forming part of Letters Patent No. 36,161, dated August 12, 1862; Reissue No. 3,319, dated March 2, 1869.

*To all whom it may concern:*

Be it known that PHILIP W. MACKENZIE, of Jersey City, in the county of Hudson and State of New Jersey, invented a new and Improved Vehicle or Propeller; and I do hereby declare the following to be a full, clear, and exact description of the construction and operation of the same, reference being had to the accompanying drawings, figures, and letters of reference thereon, making part of this specification.

Of the said drawings, Figure 1 is a sectional side elevation of the improved propeller. Fig. 2 is a sectional plan or top view of the same.

Similar letters of reference indicate like parts in all the drawings.

These drawings exhibit the invention as applied to a vehicle invented by Mackenzie; but I wish it to be distinctly understood that the improvements and invention as set forth and claimed in this patent are applicable to vehicles of various classes, differing in form and arrangement from each other and from the vehicle herein described.

The object of the invention is to connect, in a substantial manner, to wheels, a saddle-seat, which may be of any desired form or shape, (as, for instance, a horse,) so that by motion imparted by the rider the wheels will be rotated and the vehicle propelled to any desired place and in any desired direction.

The nature of the first part of the invention consists in the combination, with a saddle-seat for the rider, of a cranked axle, or the equivalent therefor, so arranged that power applied by the rider shall produce a rotary motion of the vehicle.

The nature of the second part of the invention consists in the combination, with a saddle-seat for the rider, of a cranked axle for propelling the vehicle by power applied by the rider, and a steering-wheel, so constructed that the travel or direction of the vehicle may be governed by the rider.

The third part of the invention consists in the arrangement of a universal joint, in combination with the fulcrum of the horse or other object and the steering-wheel.

The fourth part of the invention consists in the arrangement of the hinged legs with the body of the horse or object, and with the cranks for propelling the vehicle.

The fifth part of the invention consists in the arrangement of foot-rests.

The sixth part of the invention consists in the arrangement of double levers and diagonal cords, in combination with the handle of a steering-wheel and the steering-wheel.

To enable others skilled in the art to make and use this invention, I will describe the construction and operation thereof.

The horse A rests with its hind legs A′ on the steering-wheel B, which rotates on the axle C, that has its bearings in the end of a double-armed forked pendant, D. The upper end of this pendant is rounded, and turns freely in the rear end of a platform, E, and it connects to the hind legs A′ by a universal joint, *a*, so that the steering-wheel can be turned in either direction without interfering with the motion of the horse or vehicle. The front legs A″ are connected at their upper ends to the body of the horse by means of pivots *b*, and their lower ends are jointed to the cranks *c* on the shaft F, which forms the axle of the wheels G. Said axle forms at the same time the support for the front end of the arms E, and as it rotates the lower ends of the legs A″ are thrown in and out, and the motion of a cantering horse is imitated.

The arms E are provided with foot-rests or false stirrups H, and a handle, I, projects from the neck or fore part of the body of the horse, so that when the cranks C are on their lowest center the horse can be started by throwing the weight of the body on the stirrups H, and raising the front part of the horse by means of the handle I, and in the same manner, in order to keep the vehicle in motion, the power applied by the rider is alternately thrown on the seat of the vehicle, and then again on the stirrups H.

A little practice will enable children to acquire the necessary movement and become proficient in propelling the vehicle.

The handle I, which is used to raise the fore part of the horse, serves at the same time to steer the vehicle. It is secured to the upper end of a vertical arbor, *d*, the lower end of which carries a double-armed lever, *e*, and the ends of this lever connect, by diagonal chains or cords *f*, with the opposite ends of a similar lever, *g*, that is secured to the stem *h* of the pendant D, so that by turning said handle in the direction of the arrow, Fig. 2, the pendant, with the steering-wheel, turns in the direction of arrow 2, and the vehicle, instead of moving on a straight line, turns off in the direction of arrow 4, and by these means a pull on the right-hand side of the handle turns the vehicle to the right, and a pull on the left-hand side turns the vehicle to the left.

It is obvious that, instead of a horse, (which I have chosen to illustrate the invention,) any shape, form, or device may be given which fancy or choice may dictate for the vehicle; and all such modifications of construction of form would be clearly within the spirit and scope of the invention.

What is claimed as the invention of PHILIP W. MACKENZIE is—

1. In combination with a saddle-seat for the rider, the employment and use of a cranked axle arms E, and foot-rest B, so arranged that power applied by the feet of the rider shall give motion of the vehicle, substantially as described and specified.

2. The combination of the following elements, namely: a saddle-seat for the rider, a cranked axle for propelling the vehicle by power applied by the foot of the rider, and a steering mechanism, so constructed that the direction of travel of the vehicle may be governed by the rider, substantially as described and specified.

3. The universal joint, in combination with the fulcrum of the vehicle and the steering-wheel, constructed and operating substantially as and for the purposes specified.

4. The hinged legs A″, in combination with the body of the horse and with the cranks C, substantially as and for the purposes specified.

5. The foot-rests upon the arms E, substantially as and for the purposes specified.

6. The double-armed levers *e g* and diagonal cords *f*, in combination with the handle I and steering-wheel B, substantially as described and specified.

STEPHEN W. SMITH.

Witnesses:
S. HULSART,
C. A. DURGIN.